US008908032B2

(12) United States Patent
Bergström et al.

(10) Patent No.: US 8,908,032 B2
(45) Date of Patent: Dec. 9, 2014

(54) SURVEILLANCE CAMERA

(75) Inventors: Morten Bergström, Bjärred (SE); Carl-Axel Alm, Lund (SE); Mathias Walter, Arlöv (SE)

(73) Assignee: Axis AB, Lund (SE)

( * ) Notice: Subject to any disclaimer, the term of this patent is extended or adjusted under 35 U.S.C. 154(b) by 2065 days.

(21) Appl. No.: 11/855,039

(22) Filed: Sep. 13, 2007

(65) Prior Publication Data

US 2008/0084474 A1 Apr. 10, 2008

Related U.S. Application Data

(60) Provisional application No. 60/828,829, filed on Oct. 10, 2006.

(51) Int. Cl.

| | |
|---|---|
| ***H04N 7/18*** | (2006.01) |
| ***H04N 5/225*** | (2006.01) |
| ***G03B 17/00*** | (2006.01) |
| ***G08B 13/196*** | (2006.01) |

(52) U.S. Cl.
CPC ................................ *G08B 13/19619* (2013.01)
USPC ............................ 348/143; 348/373; 396/427

(58) Field of Classification Search
USPC .......................................................... 348/143
See application file for complete search history.

(56) References Cited

U.S. PATENT DOCUMENTS

| | | | | |
|---|---|---|---|---|
| 3,739,703 A | | 6/1973 | Behles | |
| 3,993,866 A | * | 11/1976 | Pearl et al. | 348/151 |
| 4,080,629 A | | 3/1978 | Hammond et al. | |
| 4,320,949 A | | 3/1982 | Pagano | |
| 4,764,008 A | | 8/1988 | Wren | |
| 5,418,567 A | * | 5/1995 | Boers et al. | 348/375 |
| D374,189 S | | 10/1996 | Hubben | |
| D391,184 S | | 2/1998 | Kawabata | |
| 5,818,519 A | | 10/1998 | Wren | |
| D412,924 S | | 8/1999 | Hiraguchi | |
| 5,940,122 A | | 8/1999 | Kizawa et al. | |
| D416,273 S | | 11/1999 | Yamakawa et al. | |
| D425,535 S | | 5/2000 | Mutoh et al. | |
| 6,064,430 A | | 5/2000 | Lefkowitz | |
| D426,250 S | | 6/2000 | Lefkowitz | |
| 6,234,691 B1 | | 5/2001 | Jones et al. | |
| 6,268,882 B1 | * | 7/2001 | Elberbaum | 348/151 |
| D449,630 S | | 10/2001 | Rak et al. | |
| D450,075 S | | 11/2001 | Uehara | |
| D452,696 S | | 1/2002 | Fenton | |
| 6,354,749 B1 | | 3/2002 | Pfaffenberger, II | |
| 6,525,766 B1 | * | 2/2003 | Ikoma et al. | 348/151 |

(Continued)

FOREIGN PATENT DOCUMENTS

| | | |
|---|---|---|
| CN | 1497950 A | 5/2004 |
| DE | 102004034825 A1 | 9/2005 |

(Continued)

*Primary Examiner* — Ranodhi Serrao
(74) *Attorney, Agent, or Firm* — Volpe and Koenig, P.C.

(57) ABSTRACT

Surveillance camera comprising a camera housing and a transparent view port cover, the camera housing including a top surface and a side surface, the side surface is extending along the periphery of the top surface is connected to the top surface, the transparent view port cover is asymmetrically arranged on the camera housing, is arranged to cover an opening in the camera housing, is curved, and is protruding over the top surface of the camera housing.

8 Claims, 3 Drawing Sheets

(56) References Cited

U.S. PATENT DOCUMENTS

| | | | | |
|---|---|---|---|---|
| 6,678,001 | B1 | 1/2004 | Elberbaum | |
| 6,715,940 | B2 | 4/2004 | Top et al. | |
| D494,992 | S | 8/2004 | Seo | |
| D499,125 | S | 11/2004 | Adachi et al. | |
| D499,126 | S | 11/2004 | Kato et al. | |
| 6,860,654 | B1 | 3/2005 | Ching-Wen | |
| 6,896,423 | B2 | 5/2005 | Arbuckle et al. | |
| 6,912,007 | B2 | 6/2005 | Gin | |
| D513,028 | S | 12/2005 | Maruyama | |
| 7,217,045 | B2 | 5/2007 | Jones | |
| 2001/0022627 | A1 | 9/2001 | Bernhardt | |
| 2001/0047743 | A1* | 12/2001 | Raad et al. | 109/50 |
| 2002/0140850 | A1* | 10/2002 | Toste et al. | 348/375 |
| 2003/0053806 | A1* | 3/2003 | Schneider | 396/427 |
| 2004/0032492 | A1 | 2/2004 | Wada et al. | |
| 2006/0017842 | A1* | 1/2006 | Jun | 348/373 |
| 2006/0050150 | A1 | 3/2006 | Yamane | |
| 2007/0053681 | A1* | 3/2007 | Arbuckle | 396/427 |
| 2008/0055409 | A1* | 3/2008 | Mars et al. | 348/143 |

FOREIGN PATENT DOCUMENTS

| | | | |
|---|---|---|---|
| EP | 1 381 002 | | 1/2004 |
| GB | 2224358 | A | 5/1990 |
| GB | 2 363 023 | | 12/2001 |
| JP | 4108274 | | 4/1992 |
| JP | 7303201 | | 11/1995 |
| JP | 9172564 | | 6/1997 |
| JP | 2000-209471 | | 7/2000 |
| JP | 2001-078063 | | 3/2001 |
| JP | 2001-346074 | | 12/2001 |
| JP | 2002116491 | A | 4/2002 |
| JP | 2003008954 | A | 1/2003 |
| JP | 2003-189138 | | 7/2003 |
| JP | 2003-302695 | | 10/2003 |
| JP | D1214369 | | 7/2004 |
| JP | D1222623 | | 11/2004 |
| KR | 20030009586 | A | 2/2003 |
| TW | D104308 | | 4/2005 |
| TW | D112306 | | 8/2006 |
| TW | D113100 | | 9/2006 |
| WO | 2004/036925 | | 4/2004 |
| WO | 2006/012524 | | 2/2006 |

* cited by examiner

SURVEILLANCE CAMERA

CROSS REFERENCE TO RELATED APPLICATION(S)

This application claims the benefit of U.S. provisional application No. 60/828,829 filed Oct. 10, 2006, which is incorporated by reference as if fully set forth.

FIELD OF INVENTION

The present invention relates to a surveillance camera.

BACKGROUND

Surveillance is desired in a lot of areas where space is limited. Many of those areas have limited room height, e.g. basements, busses, train carriages, subway cars, elevators, passages and corridors.

Usually surveillance cameras are not mounted in the ceiling because it increases the risk of people getting hurt or injured by the surveillance cameras, e.g. by hitting their heads on surveillance cameras. If the surveillance cameras are mounted in the ceiling anyway, they are recessed or flush mounted. However, in some environments it is not possible to recess cameras in the ceiling. The present invention is designed to solve these problems or at least to make these problems less evident.

SUMMARY

The object is achieved by means of a surveillance camera including a camera housing and a transparent view port cover. The camera housing includes a top surface and a side surface, the side surface extends along a periphery of the top surface and is connected to the top surface. The transparent view port cover is asymmetrically arranged on the camera housing, and is arranged to cover an opening in the camera housing. The transparent view port cover is curved, and protrudes over the top surface of the camera housing.

BRIEF DESCRIPTION OF THE DRAWINGS

Other features and advantages of the present invention will become apparent from the following detailed description of a presently preferred embodiment, with reference to the accompanying drawings, in which.

DETAILED DESCRIPTION OF THE PREFERRED EMBODIMENTS

Introduction to the Embodiments

Figure 1A:
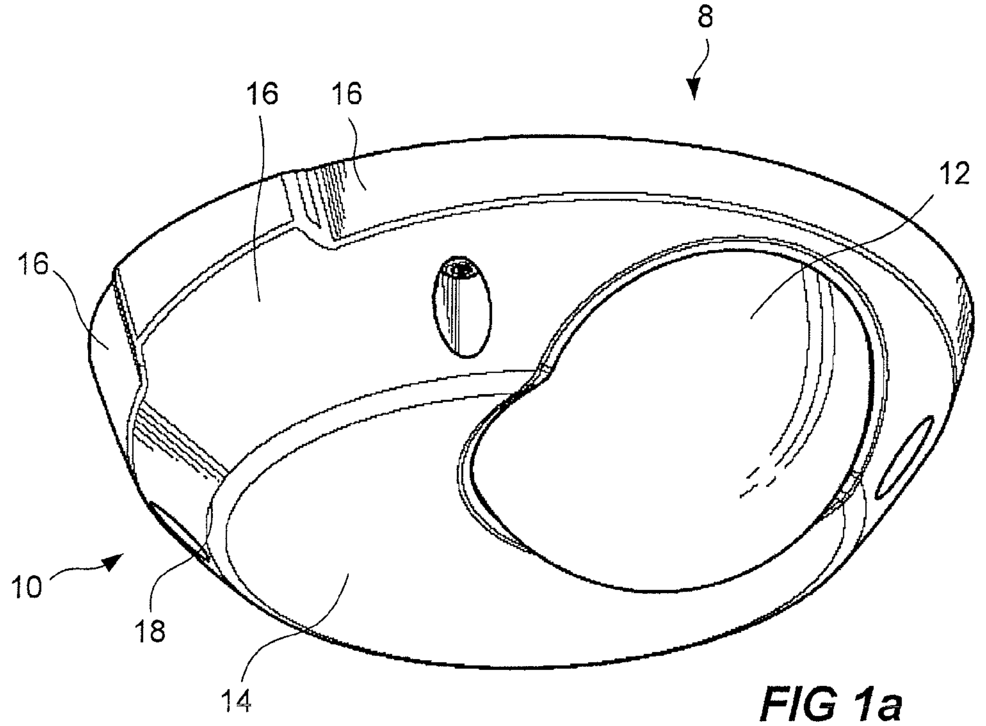
FIG. 1*a* is a perspective view of one embodiment of the surveillance camera according to the present invention.
Figure 1B:
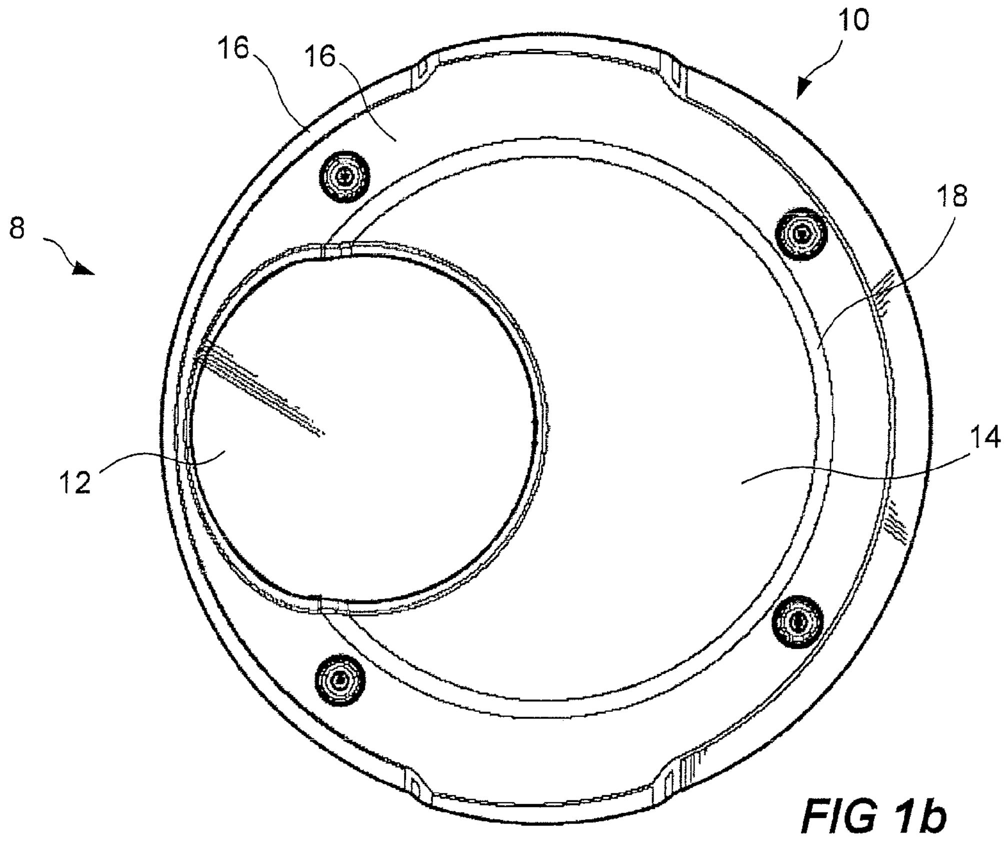
FIG. 1*b* is a top view of one embodiment of the surveillance camera according to the present invention.
Figure 1C:
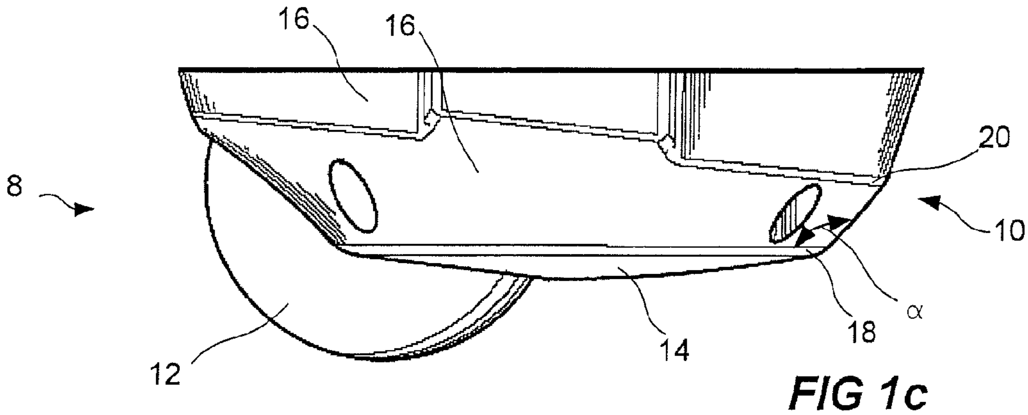
FIG. 1*c* is a side view of one embodiment of the surveillance camera according to the present invention.
Figure 1D:
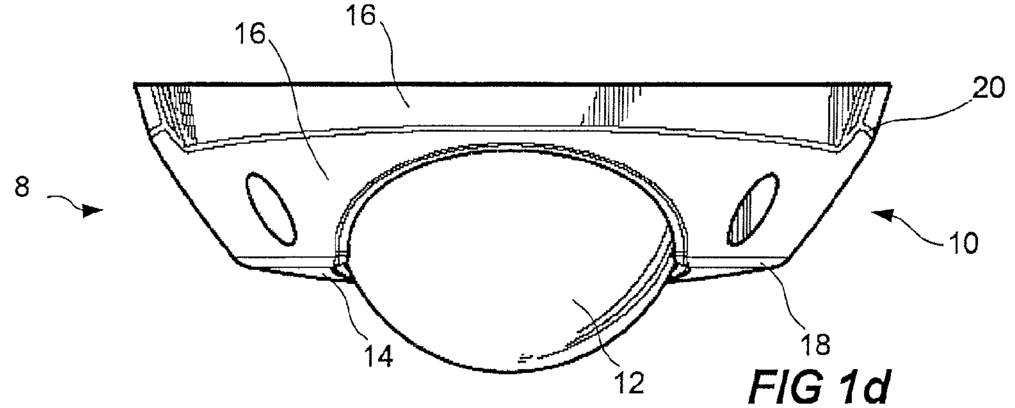
FIG. 1*d* is a front view of one embodiment of the surveillance camera according to the present invention.

In particular, according to an aspect of the invention, the object is accomplished by means of a surveillance camera comprising a camera housing and a transparent view port cover, wherein the camera housing includes a top surface and a side surface, the side surface extends along a periphery of the top surface and is connected to the top surface, wherein the transparent view port cover is asymmetrically arranged on the camera housing, is arranged to cover an opening in the camera housing, is curved, and is protruding over the top surface of the camera housing. One advantage of this embodiment is that it makes it possible to make a well protected surveillance camera of small height. It is possible to mount a camera of small height without tampering much with the surface to which the camera is to be attached to compared to the tampering that is necessary when mounting recessed cameras. The small height of the camera decreases the risk of someone getting injured by the camera when walking by.

According to another embodiment said opening in the camera housing is partly arranged in the top surface and partly in a portion of the side surface. This may provide an increased view angle without the need to increase the height of the surveillance camera.

According to yet another embodiment the transparent view port cover forms a part of a sphere.

According to a further embodiment the transparent view port cover forms a part of a cylinder.

According to another embodiment the asymmetric arrangement of the transparent view cover is achieved by arranging the transparent view cover at a distance from the centre of the camera housing in a plane projection viewed from the top surface side of the surveillance camera.

According to another embodiment the side surface extends from said top surface at an angle.

According to another embodiment the surveillance camera further comprises a lens and an image sensor, wherein the lens and the image sensor are arranged in the opening in the camera housing and are covered by the transparent view port cover.

According to another embodiment the surveillance camera further comprises a network connector, wherein the network connector is arranged within the camera housing, is arranged at a distance from said opening in the camera housing and in a plane essentially parallel with the top surface, and is covered by the camera housing.

According to a further embodiment the surveillance camera further comprises a CPU (Central Processing Unit), a memory and power circuitry, wherein the CPU, the memory and the power circuitry are arranged within the camera housing at a distance from said opening in the camera housing and in a plane essentially parallel with the top surface, and are covered by the camera housing.

A further scope of applicability of the present invention will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from this detailed description.

Detailed Description

In FIGS. 1*a-d* a surveillance camera 8 is shown. The surveillance camera 8 includes a camera housing 10 and a transparent view port cover 12.

The camera housing 10 includes a substantially flat top surface 14 and a side surface 16. The side surface 16 extends along the periphery 18 of the top surface 14 and is connected to the top surface 14 along said periphery 18 of the top surface 14. Moreover, the side surface 16 extends from the top surface 14 at an angle α in relation to the top surface 14 in order to form the housing 10. The angle α may vary depending on the position along the periphery 18 of the top surface 14. According to one embodiment, α is larger than 90 degrees in order to provide smoother appearance and making the camera housing more resistant to violent handling or treatment, especially when mounted. Further, the side surface 16 may be further angled with respect to the top surface 14 at a distance from the periphery 18 of the top surface 14, see for example the additional angling of side surface 16 at position 20 in FIG. 1*c-d*.

The transparent view port cover 12 covers an opening in the camera housing 10 and is arranged asymmetrically on the camera housing, i.e. it is arranged at a distance from the centre of the camera housing 10 in a plane projection viewed from the top surface 14 side of the surveillance camera 8.

According to one embodiment the opening in the camera housing 10 is arranged as a combination of an opening in the top surface 14 and an opening in the side surface 16.

Hence the opening is partly defined by an edge of the top surface 14 and partly defined by an edge of the side surface 16. Said edge of the top surface 14 may extend along a circular segment and said edge of the side surface 16 may extend along a circular segment. The combination of these two edges forms an opening in the camera housing 10.

As seen in FIGS. 1*a-d* the opening in the side surface 16 may be described as a notch in the camera housing 10. In this embodiment the view port cover 12 extends from the top surface 14 past the periphery 18 of the top surface 14 and to a position on the side surface 16 that is at a distance from the periphery 18 of the top surface 14.

By arranging the opening asymmetrically and by arranging the opening into the side surface 16 as well as the top surface 14, the surveillance camera 8 may be given a very small height at the same time as a large tilting angle is enabled. The possible tilting angle of the surveillance camera 8 of the embodiment shown in the figures is larger than 90 degrees.

According to one embodiment the transparent view port cover 12 is convexly curved and protruding over the top surface 14 of the camera housing 10. In the embodiment shown in FIGS. 1*a-d* this is achieved by forming the transparent view port cover 12 into a spherical shape, i.e. the transparent view port cover 12 is formed as a part of a sphere. According to another embodiment the convexly curved transparent view port cover 12 is formed as a cylindrical shape arranging the curved surface facing away from the camera housing 10, i.e. the transparent view port cover 12 is formed as a part of a cylinder.

The convexly curved shape of the transparent view port cover 12 has the advantage of being a robust protection of the camera parts below. Accordingly, the shape of the transparent view port cover 12 contributes to the protection of the surveillance camera 8 against attempts to tamper with it or vandalise it. Moreover, by providing a camera housing 10 and a transparent view port cover 12 which together cover the entire camera it is possible to seal the camera from the surrounding environment and thereby withstand high humidity, low temperature, dust, etc.

Figure 2:
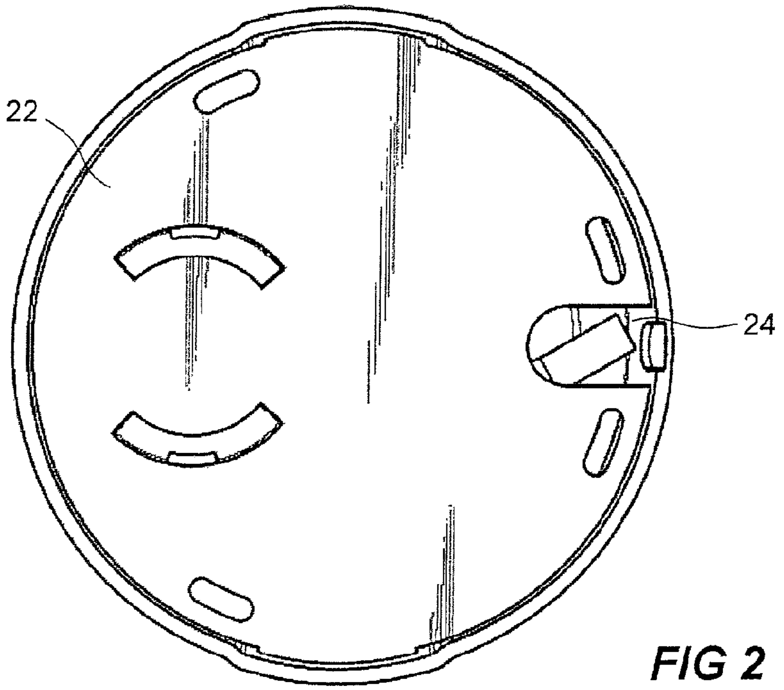
FIG. 2 is a bottom view of one embodiment of the surveillance camera according to the present invention.
Figure 3:
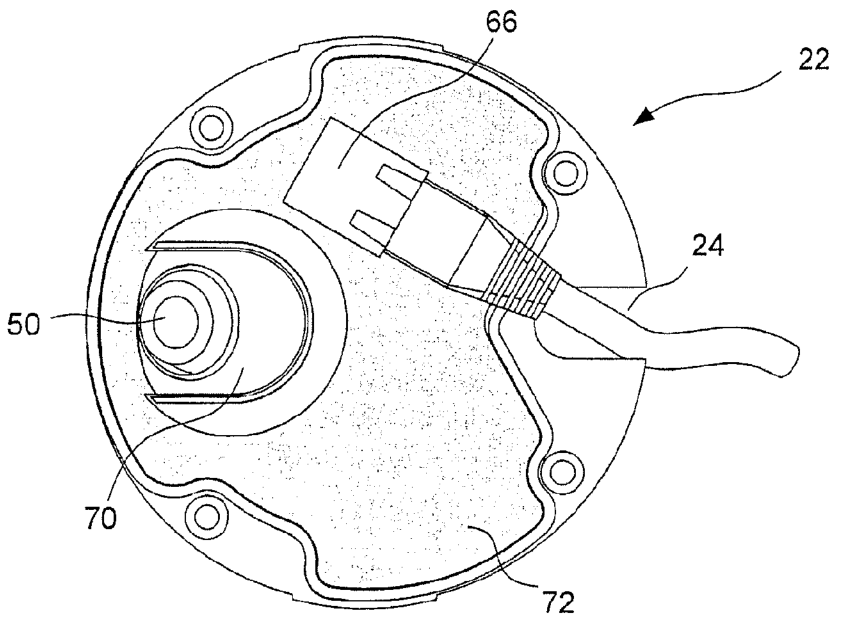
FIG. 3 shows the interior of the surveillance camera, i.e. the surveillance camera without a cover, according to the present invention.

Additionally the surveillance camera 8 includes a base plate 22, as shown in FIG. 2 and in FIG. 3, which is essentially parallel with the top surface 14. The base plate 22 may be provided with a cable opening 24 enabling a connection of a network cable and if necessary a power cable within the camera housing 10. The cable opening 24 may alternatively be arranged in the side surface 16 of the camera housing 10 or alternatively may connectors, e.g. network and power connectors, be arranged in the side surface 16 of the camera housing 10.

Figure 4:
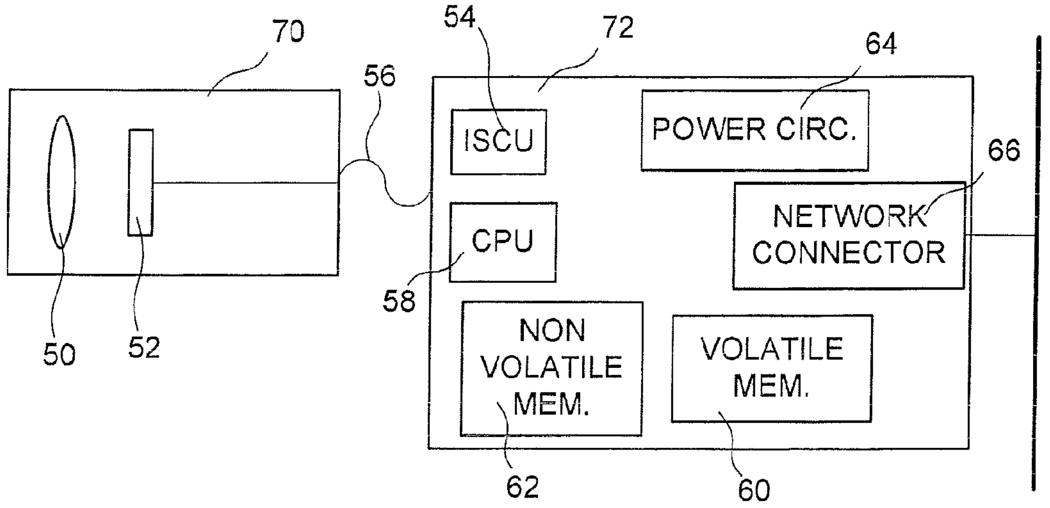
FIG. 4 is a schematic view of the arrangement of functional parts of one embodiment of the surveillance camera according to the present invention.

Further, the surveillance camera 8 includes a lens 50, an image sensor 52, an ISCU (Image Sensor Control Unit) 54, flexible transmission medium 56, a CPU 58, at least a memory 60, 62 e.g. a volatile memory 60 and/or a non volatile memory 62, power circuitry 64, and a network connector 66, see FIG. 4. The detailed functionality and interaction between these devices in order to capture and deliver images are well known to a person skilled in the art of surveillance cameras.

Now referring to FIGS. 3 and 4, according to one embodiment the surveillance camera includes one movable unit 70 and one stationary unit 72 wherein the movable unit 70 includes the lens 50 and the image sensor 52. The movable unit 70 is arranged in the opening of the camera housing 10 in order to receive incident light on the image sensor 52 via the transparent view port cover 12 and the lens 50. The movable unit 70 is turnable about at least a tilt axis in order to enable tilt of the lens 50. However, according to one embodiment the movable unit 70 is arranged to be turnable in any direction, e.g. like a ball joint.

The stationary unit 72 is a part of the base plate 22. The stationary unit 72 is covered by the camera housing and is not positioned in the opening covered by the transparent view port cover 12. The stationary unit 72 may include additional electronic devices and/or other electronic devices than previously described necessary to implement a surveillance camera, e.g. the ISCU 54, the CPU 58, the volatile memory 60, the non volatile memory 62, power circuitry 64, and the network connector 66. The network connector 66 may be a socket or a plug for connecting to the network. However, it may also be soldering points where the wires of the network cable are soldered to the circuit board. In such case the network socket or network plug may be attached to this cable at a distance from the surveillance camera.

The flexible transmission medium 56 is arranged to transfer data, e.g. image data, and control signals between the movable unit 70 and the stationary unit 72. The flexible transmission medium 56 may be a flexible cable or any other flexible connection known to the skilled person.

By arranging the movable unit 70 substantially in the plane of the base plate 22 and arranging the stationary unit 72 substantially in the same plane as the base plate 22 and next to the moveable unit 70 it is possible to minimize the height of the surveillance camera, i.e. minimize the distance from the surface onto which the surveillance camera is to be mounted and to the most protruding, in an orthogonal direction from the surface, portion of the surveillance camera.

According to one aspect of the invention the surveillance camera is powered by means of power over Ethernet, i.e. the power supply is provided via the network cable. However, in another embodiment the surveillance camera is powered via an ordinary power supply and connected directly to the power circuitry of the surveillance camera.

What is claimed is:

1. Surveillance camera comprising:

a base plate;

a stationary unit arranged on the base plate, and including at least one unit relating to image processing;

a camera housing including a top surface, at least one side surface, and an opening in at least a portion of the top surface, the opening being arranged such that its center is offset at a distance from the center of the top surface in a plane projection viewed from the top surface, the top surface being substantially parallel with the base plate, the side surface extending along a periphery of the top surface and being connected to the top surface; and a transparent view port cover for covering the opening, the transparent view cover having a curved surface protruding over the top surface of the camera housing, wherein the transparent view cover forms a part of a sphere; and a movable unit comprising a lens and an image sensor, the movable unit being arranged in the opening of the camera housing, and arranged on the base plate next to the stationary unit.

2. Surveillance camera according to claim 1, wherein a first portion of the opening is arranged in the top surface and a second portion of the opening is arranged in the side surface.

3. Surveillance camera according to claim 1, wherein the transparent view port cover forms a part of a cylinder.

4. Surveillance camera according to claim 1, wherein the side surface is extending from said top surface at an angle.

5. Surveillance camera according to claim 1, wherein the lens and the image sensor are arranged in the opening in the camera housing and are covered by the transparent view port cover.

6. Surveillance camera according to claim 1, further comprising a network connector, wherein said network connector is arranged within the camera housing, is arranged at a distance from the opening in the camera housing and in a plane essentially parallel with the top surface, and is covered by the camera housing.

7. Surveillance camera according to claim 5, further comprising a CPU (Central Processing Unit), a memory and a power circuitry, wherein the CPU, the memory and the power circuitry are arranged within the camera housing, are arranged at a distance from said opening in the camera housing and in a plane essentially parallel with the top surface and are covered by the camera housing.

8. Surveillance camera according to claim 1, wherein the transparent view cover is fixed to the camera housing and both the transparent view cover and the camera housing are stationary.

* * * * *